June 26, 1934.  H. L. TANNER  1,964,228
VERNIER TELEMETRIC SYSTEM
Original Filed April 20, 1929   3 Sheets-Sheet 1
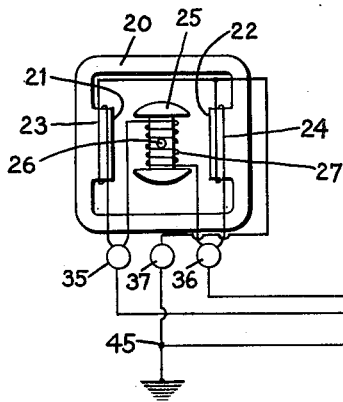
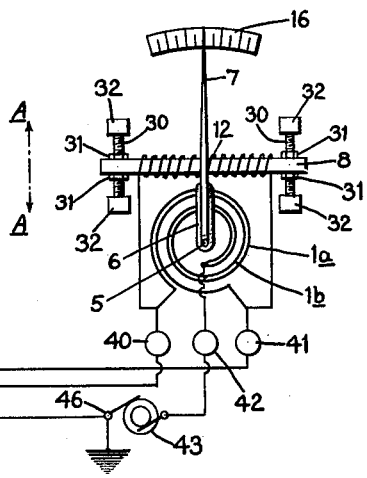
FIG.1.
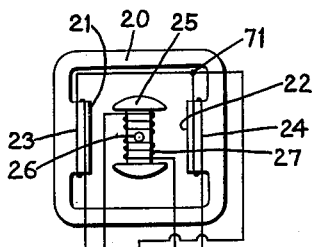
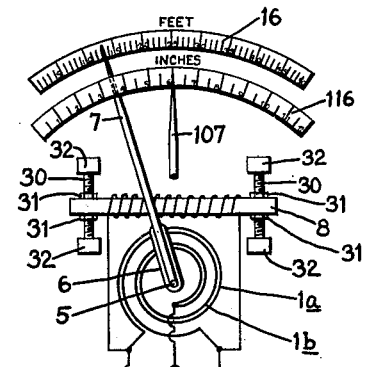
FIG.2.
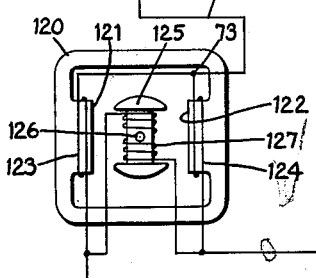
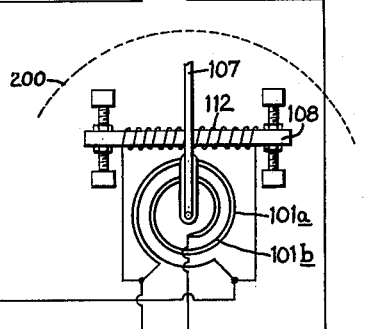
Inventor
Harry L. Tanner
By his Attorneys
Cooper, Kerr & Dunham June 26, 1934.   H. L. TANNER   1,964,228
VERNIER TELEMETRIC SYSTEM
Original Filed April 20, 1929   3 Sheets-Sheet 2
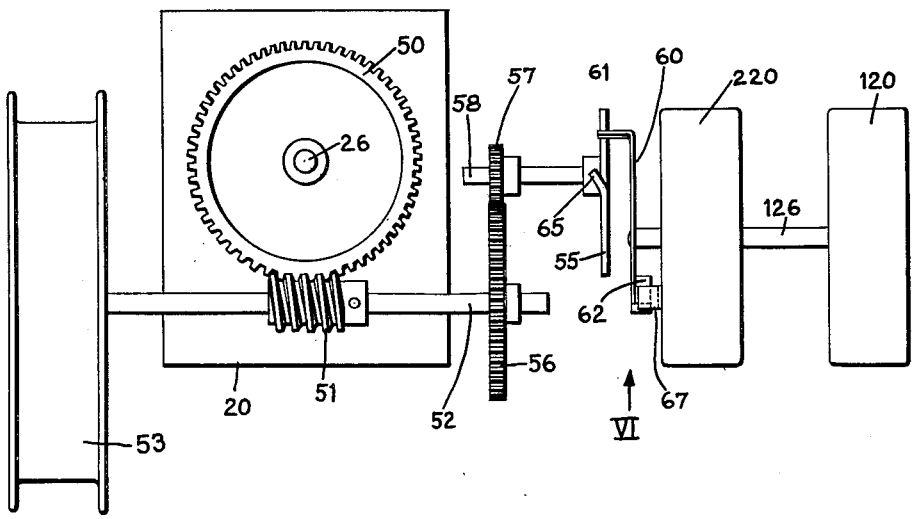
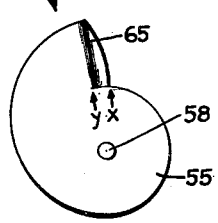
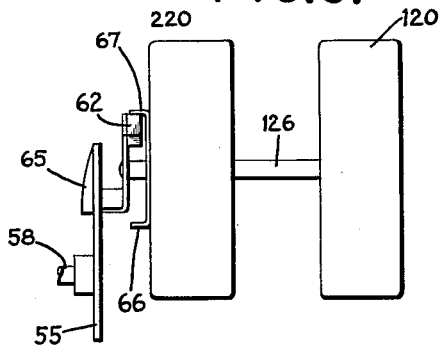
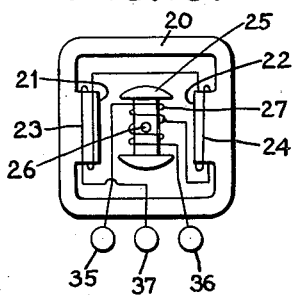
Inventor
Harry L. Tanner
By his Attorneys
Cooper, Kerr + Dunham June 26, 1934.  H. L. TANNER  1,964,228
VERNIER TELEMETRIC SYSTEM
Original Filed April 20, 1929   3 Sheets-Sheet 3
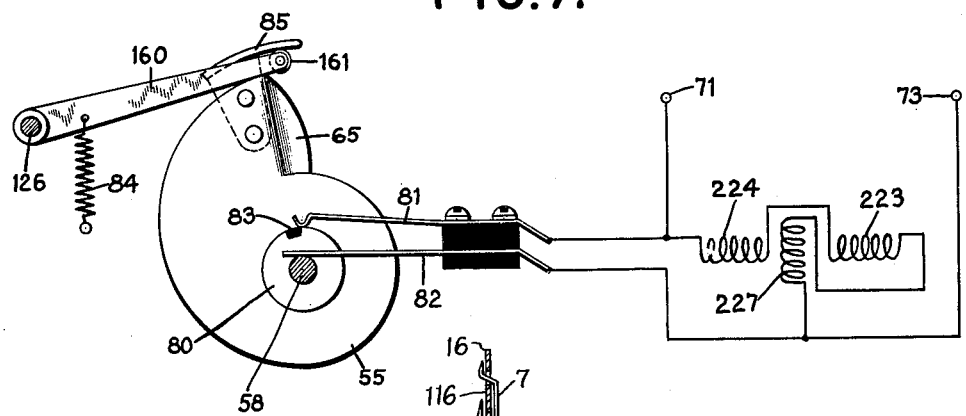
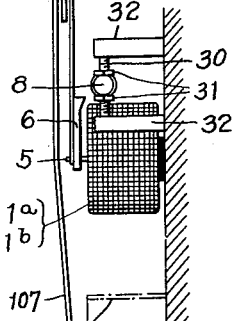
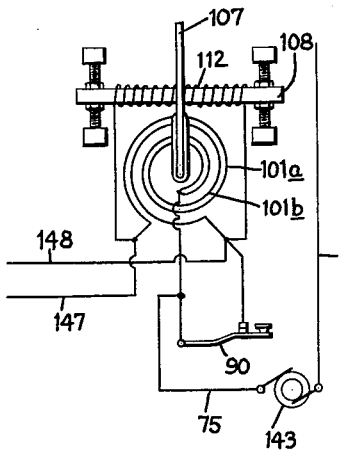
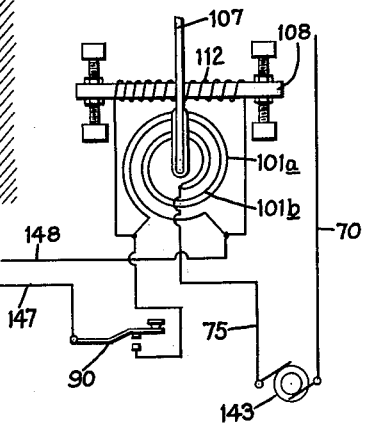
Inventor
Harry L. Tanner
By his Attorneys
Cooper, Kerr & Dunham Patented June 26, 1934

1,964,228

UNITED STATES PATENT OFFICE 1,964,228

VERNIER TELEMETRIC SYSTEM

Harry L. Tanner, Brooklyn, N. Y.; The National City Bank of New York, executor of said Harry L. Tanner, deceased, assignor, by mesne assignments, to Wallace & Tiernan Products, Inc., Belleville, N. J., a corporation of New Jersey Application April 20, 1929, Serial No. 356,636
Renewed April 11, 1934

10 Claims. (Cl. 177—351)

This invention relates to telemetric systems and has for its main purpose, among other objects and advantages which will become apparent as this disclosure proceeds, to provide an economical, accurate, and reliable system of instrumentalities for indicating at a distance, more or less remote, the position of an object or element.

Referring to the drawings, which illustrate what I now consider preferred forms of the invention:

Fig. 1 is a diagrammatic view, also shown as Fig. 2 of my copending application Serial No. 280,729, of certain instrumentalities and connections preferably, but not indispensibly, embodied in the present invention.

Fig. 2 is a similar view but illustrating improvements devised by me.

Fig. 3 is a view showing the mechanical connections of the transmitting mechanism, the electrical connections of which are shown in Fig. 2 at the left.

Fig. 4 is a detail face view of a cam forming a part of the transmitting mechanism.

Fig. 5 is an edge view of the cam shown in Figs. 3 and 4, looking along the arrow IV in Fig. 4.

Fig. 6 is a detail view of a part of the mechanism shown in Fig. 3, looking in the direction of the arrow VI.

Fig. 7 is a partly diagrammatic view illustrating a modification.

Fig. 8 is a fragmentary diagrammatic view illustrating a further modification.

Fig. 9 is a view similar to Fig. 8 but illustrating a still further modification.

Fig. 10 shows a modified form of electrical connections for a transmitter.

Fig. 11 is an elevation of the meters as seen from the right-hand side of Fig. 2.

To facilitate explanation of the present features of invention, I shall first somewhat briefly describe a combination of instrumentalities disclosed more fully in my copending United States application Serial No. 280,729, filed May 26, 1928.

Referring to Fig. 1, the transmitting instrument is shown at the left and the indicating instrument at the right. The transmitting instrument has a stator or stationary element 20 of magnetizable material, as laminations of iron, silicon steel, or the like, provided with poles 21, 22, and windings 23, 24. The coils 23, 24, are so relatively wound and connected that, when energized, the polarity of the poles 21, 22 will at all times be opposite to each other. In other words, alternating magnetic flux will pass between the poles 21 and 22. The transmitting instrument has also a rotor or armature 25 mounted on a shaft 26 and carrying a coil 27. Preferably the drum of the rotor 25 is constructed of magnetizable material such as iron or silicon steel laminations.

The indicating instrument shown at the right in Fig. 1 is, in many respects, the same as that shown in Figs. 1 and 2 of my United States Letters Patent No. 1,587,050, patented June 1, 1926, the coil 1a, 1b, corresponding to the coil 1 in the patented instrument, the elements 5, 6, 7 and 16, corresponding to the similarly designated elements in the patented arrangement, and the coil 12 corresponding to the coil 12, 13 in the patented arrangement. Several differences are, however, to be noted. In the patented arrangement (i. e. Figs. 1 and 2 of the patent) the deflecting coil, wound upon the centralizing bar, is shown and described as "a coil of wire preferably in the form of a plurality of opposed windings 12, 13". In short, in the instrument shown in Figs. 1 and 2 of the patent, the deflecting coil is a two-winding coil. In the present (Fig. 1) indicating instrument the deflecting coil 12 is a single winding coil. Also in the instrument shown in Figs. 1 and 2 of the patent the magnetizing coil 1 is a single winding coil whereas in the present (Fig. 1) indicating instrument the magnetizing coil is a two-winding coil 1a, 1b. The last mentioned coil may be, and preferably is constructed by winding two wires together on the same spool in the same direction to form the two windings 1a, 1b, and, as shown, these two windings are directly electrically connected together at one end, which may be either the starting or finishing end of the windings.

The magnetic centralizing bar 8 is mounted so as to be adjustable toward and away from the vane or armature 6 and means are provided whereby the adjustment may be made and held. One form of such means is illustrated and may be constructed as follows. The bar 8 is supported by threaded rods 30 which pass through the bar with suitable clearance and to which the bar is secured in various positions of adjustment along the rods by the clamping nuts 31, 31, provided on the rods. The rods 30 are secured to suitable standards or brackets 32, 32, so as to be non-rotatable and otherwise immovable. By virtue of the provision of such means the bar may be adjusted in the direction A—A, i. e. toward or away from the movable armature or vane, and clamped in any desired position of adjustment. The magnetic centralizing force acting upon the movable vane or armature depends upon the magnetomotive force set up by the magnetizing coil, which depends upon the current flowing through the said coil, and also upon the reluctance of the magnetic path, which includes the air gap between the centralizing bar and the vane or armature. By virtue of the adjusting means, such as that above described, a stock instrument may be adjusted to read accurately in various installations having lines of different electrical constants. Other things being the same, the effect of the adjustment is to spread or contract the scale reading to either side of central position.

In the transmitting instrument the movable armature or rotor coil 27 is connected across the terminals 35 and 36, the leads being sufficiently flexible to permit the desired movement of the armature or rotor. One end of each of the transmitter stator or field windings 23, 24, is connected to a corresponding one of the terminals 35, 36, and the other ends of the said windings 23 and 24 are connected together and to the terminal 37 of the transmitting instrument. In the indicating instrument the deflecting coil 12 is connected across the terminals 40, 41, sufficient flexibility in the leads being provided to permit of the desired range of adjustment of the centralizing bar 8. One winding 1a of the magnetizing coil is connected at one end to the terminal 40, the other winding 1b of the magnetizing coil is connected at one end to the terminal 41, and the other ends of both windings 1a and 1b are connected together and to the terminal 42. While the source of E. M. F., diagrammatically illustrated as an A. C. generator 43, may be connected in other places along the line 44 between the terminals 37—42, I have shown it at or near the indicating instrument. If earth or ground conduction is permissible and desirable the metallic or wire line connection 44 may be dispensed with between the points 45 and 46. The terminal 35 is connected to the terminal 40 by a line wire 47 and the terminals 36 and 41 are connected by a line wire 48. The impedance of the windings 1a, 1b is high as compared to that of the deflecting coil 12. The impedance of the windings 23, 24 is also comparatively high. It will be understood further that the windings 23 and 24 are so wound and connected that they aid each other in causing magnetic flux to flow from one of the poles 21, 22, to the other.

The operation of the system shown in Fig. 1 is substantially as follows: Assuming that the rotor coil 27 of the transmitter is in mid or neutral position, i. e. no E. M. F. is induced therein by the alternating magnetic flux set up by the field or stator, there will be no current flowing through coils 27 and 12. The two current paths 43—42—1a—40—47—35—23—37—45—44—46 and 43—42—1b—41—48—36—24—37—45—44—46 are symmetrical with respect to impedances so that when there is no E. M. F. induced in the rotor coil 27 by its stator field, the points 35 and 36 are at the same potential and the points 40—41 are at the same potential. In short, the line drop produced by the magnetizing or conduction current is substantially neutralized so far as producing disturbing effects upon the induction circuit 27—35—47—40—12—41—48—36 is concerned. When the rotor coil 27 occupies a position to one side or the other of its mid or neutral position, an E. M. F. is induced in it causing current to flow through the circuit 27—35—47—40—12—41—48—36 in one relative direction or the other and of magnitude depending upon the deflection of the rotor coil from mid position. The line drop produced by this current is substantially neutralized so far as producing disturbing effects upon the magnetizing circuit is concerned. Thus while the line drop produced by the flow of induction current increases the current flowing in one of the two branches 43—42—1a—40—47—35—23—37—45—44—46 and 43—42—1b—41—48—36—24—37—45—44—46, it simultaneously and substantially equally decreases the current flowing in the other of the last mentioned two branches.

Instead of connecting the coils 23, 24, and 27, of the transmitting instrument as shown in Fig. 1 (or in Fig. 2 hereinafter described) they may be connected as shown in Fig. 10. Referring to Fig. 10 it will be seen that the rotor coil 27 is connected across the terminals 35—36 but its mid point is connected to one end of the stator coil 24 whose other end is connected to one end of the other stator coil 23. The remaining end of the stator coil 23 is connected to the terminal 37. The coils are poled as indicated. This form of connections (Fig. 10) provides an arrangement which is less sensitive to variations of resistance of the transmission lines employed.

By virtue of these various provisions, including the adjustability of the centralizing bar 8, identical or stock transmitting and indicating instruments may be employed in different installations having different line lengths, etc., with great faithfulness and accuracy in indication at 7—16 of the position of the rotor 25 at the transmitter, even when the length of line is comparatively great.

Recapitulating: when the rotor coil 27 is in a neutral position, i. e. in such position that the magnetic flux passing from one of the poles 21, 22 to other of said poles does not pass through the coil 27, no E. M. F. will be induced in the latter. When the rotor 25 is shifted so that the rotor coil 27 is shifted in one direction or the other from its neutral position an E. M. F. will be induced in the said coil 27 and current will flow through the coils 27 and 12. The instantaneous direction of the current flow through the coil 12 with respect to the current flowing through the coil 1a, 1b will depend upon which direction the rotor 25 and its coil 27 have been shifted from neutral position. The magnitude or strength of the current flowing through the coil 12 will depend upon the extent to which the rotor 25 and its coil 27 have been moved from neutral position. The object whose position is to be indicated at 7—16 may be, for example, a float (not shown) which actuates the shaft 27 of the rotor 25 as the level of liquid rises and falls in a tank or reservoir, and the level of the liquid would in this case be indicated at 7—16.

In many installations it is desirable to have a finer reading or indication. Thus, supposing that the indicator 7—16 indicates liquid level in feet and has a range of reading of 50 feet, it may be desirable not only to read the liquid level in feet but accurately in subdivisions thereof, say inches or fractions of an inch. I have devised various combinations of instrumentalities for accomplishing this and shall now proceed to describe one of such systems.

The indicating mechanism is shown somewhat diagrammatically (but sufficiently for an understanding of the construction and operation thereof) at the right of Fig. 2. It comprises two indicators or meters which are substantially duplicates of each other except in respects hereinafter noted. The upper one of the two indicators or meters comprises the elements and connections 1a, 1b, 5, 6, 7, 8, 12, 16, 30, 31 and 32, all of which have been described above in connection with Fig. 1 and also in my copending application Serial No. 280,729. The scale 16 of this meter or indicator, which may be called the coarse meter, is shown calibrated to read in feet, the full scale reading being 50 feet. Except that its scale 116 is calibrated to read in inches and fractions thereof, the full scale reading being 12 inches or 1 foot, the lower of the two meters (Fig. 2) is identical to the upper one. It is unnecessary to designate all of the parts of the lower meter, which may be called the fine or vernier meter, but it is convenient to refer to the coils 101a, 101b, 112, the bar 108, the pointer 107 (a part of which is broken away in Fig. 2 for clearness of illustration) and the scale 116, all of which correspond respectively to the elements 1a, 1b, 12, 8, 7, 16, of the upper or coarse meter, except, as stated above, the scale 116 is calibrated differently from the scale 16. As will hereinafter more fully appear, if and when it is desired to take only a coarse reading, the scale 16 alone is read. If and when it is desired to take a fine or more accurate reading, the reading in feet is taken from the scale 16 and to this is added the reading in inches obtained from the scale 116. The two meters are so relatively located or associated as to facilitate accurate conjoint or composite reading without likelihood of error as will hereinafter be described. I shall now proceed to describe one form of transmitting mechanism employed in combination with the composite meter or indicating mechanism.

The transmitter 20 shown in Fig. 2 (at the upper left) is the same as that shown in Fig. 1 (at the left), the same reference numerals being employed to indicate the corresponding parts. This transmitter 20 is shown only in outline in Fig. 3, its shaft 26 being actuated by a worm gear 50 secured thereto. The gear 50 is driven by a worm 51 secured to a shaft 52 which is turned by a drum 53 also secured to the shaft, and which drum may be turned by the rising and falling of a float (not shown) suitably connected to the drum as by means of a cable and counterweight. The design and electrical connections are such that the pointer 7 will indicate the liquid level (or position of the float) in feet and coarse fractions of feet. The transmitter 20 (Fig. 2) may be conveniently referred to as the coarse transmitter.

A second transmitter 120 (Fig. 2) is provided for actuating or controlling the fine or vernier (lower) meter. This second transmitter 120, which may be conveniently called the fine or vernier transmitter, is identical to the transmitter 20 (the parts 120 to 127 inclusive of the transmitter 120 corresponding in construction and operation to the parts 20 to 27 inclusive, respectively, of the coarse transmitter 20) except that the shaft 126 of the transmitter 120 is differently actuated, as I shall now set forth.

Referring to Fig. 3, in which the transmitter 120 is shown only in outline, it will be seen that the shaft 52 which operates the shaft 26 of the transmitter 20 also drives or positions a cam 55 through a gear 56 secured to the shaft 52 and which gear 56 meshes with a gear 57 secured to a shaft 58 to which the cam 55 is also secured. The design in the particular case under consideration is such that the cam 55 is rotated through one revolution by a travel of one foot of the float. The shaft 126 of the transmitter 120 has secured thereto an arm 60 which is provided with a laterally extending finger 61 at one end and a weight 62 at its other end. The shaft 126 is offset with respect to the cam shaft 58 so that the finger 61 may be moved about its axis from an outer position, out of the path of the periphery of the cam 55, into engagement with the periphery of the cam. The design, construction, and connections are such that when the finger 61 is caused to engage the periphery of the cam 55, the fine reading or vernier meter (Fig. 2) will indicate the reading of liquid level in inches and fractions thereof to be added to the next coarse or feet reading below the pointer of the upper or coarse meter (Fig. 2). The weight 62 biases the arm 60 to a position in which the finger 61 is just radially out of the path of the cam 55.

A motor 220, shown in outline in Fig. 3 and somewhat diagrammatically in Fig. 2, is provided to move the finger 61 into engagement with the periphery of the cam 55 when it is desired to take a fine reading. This motor 220 is similar in construction to the transmitters 20 and 120, as indicated by the elements 220, 221, 222, 223, 224, 225, 227 which correspond to the elements 120, 121, 122, 123, 124, 125, 127, which in turn correspond to the elements 20, 21, 22, 23, 24, 25, 27, but the motor 220 is so designed and its coils are so connected that when energized, as hereinafter described, the rotor 225, which is secured to the shaft 126, moves the finger 61 into engagement with the periphery of the cam 55 in opposition to the biasing or turning effort of the weight 62.

In order to prevent injury to the mechanism by continued engagement of the finger 61 with the periphery of the cam 55 during more than one revolution of the latter in a clockwise direction (as viewed in Fig. 4), the cam is provided with a laterally inclined lip 65 (Figs. 3, 4 and 5) which extends between the highest and lowest parts of the cam and is adapted to engage and move the finger 61 axially in a direction away from the cam. The arm 60 is so constructed as to be yieldable so as to permit such movement of the finger 61 laterally of the cam 55.

A pair of resilient stops are secured to a stationary support such as the frame or housing of the motor 220 (Fig. 6). The lower one, 66, of these two resilient stops is adapted to be engaged by the weight 62 so as to limit the extent of movement of the feeler finger 61 away from the cam 55. The other resilient stop, 67, is provided for the following purpose.

The limit of the indication producing movement of the cam 55 is at X (Fig. 4). Upon continued rotation of the cam 55 in a clockwise direction the finger 61 may ride on the part of the periphery of the cam from X to Y. When the cam moves beyond the Y position with respect to the finger 61, the resilient stop 67 holds the arm 60 in such position that the finger 61 will not be radially inward of the point Y of the cam when the latter reverses but will be in position to be picked up by the periphery of the cam upon such reverse movement.

The electrical connections have been dealt with to some extent above. I shall now trace the complete circuit (Fig. 2):—from the source of E. M. F. (shown as an alternating current generator 143) through the supply wire 70 to the common ends of the windings 1a, 1b, of the coarse reading (upper) meter, and from each of the other ends of the windings 1a, 1b, across which the coil 12 is connected, through a corresponding one of the line wires 48, 47, to a corresponding one of the coils 24, 23, of the coarse transmitter 20. The rotor coil 27 is connected across the line wires 48, 47 at the transmitter station. The other ends of the coils 24, 23, are connected at the point 71 to the wire 72 which connects to the common point 73 of the stator coils 124, 123 of the fine or vernier transmitter 120. The rotor coil 127 is connected across the other ends of the coils 124, 123, and the last mentioned ends of the last mentioned coils are each connected to a corresponding one of the line wires 148, 147. The line wires 148, 147, connect to a corresponding winding 101a, 101b, of the fine or vernier meter and the winding 112 is connected across the lines 148, 147. The other ends of the windings 101a, 101b are connected to each other and to the other side 75 of the supply.

The rotor or armature coil 227 of the motor 220 and the stator or field windings 223, 224, are connected in series across the line 76—77 which extends to the meter station and is connected to the supply 70—75. A manually operable normally open switch 78 is provided in one side (76) of the line 76—77 at the meter station. In certain installations, as for example when there are combustible gases present, this switch 78 is preferably one having its contacts adapted to be bridged by mercury in an evacuated glass tube and adapted to be rocked to make and break the circuit.

The operation of the form of invention shown in Figs. 2 to 6 will, it is believed, be understood in view of the foregoing description but may be summarized as follows:

The position of the rotor 25 of the transmitter 20, either central or to one side or the other of mid position, is determined in the specific use under consideration by the level of the liquid whose height is to be indicated. The upper meter indicates at 7—16 the height of the liquid in feet and coarse fractions of feet. The switch 78 is normally open, the motor 220 deenergized, the finger 61 is held by the weight 62 out of the path of the periphery of the cam 55, and the needle or pointer 107 is off the scale 116 so that the operator may not take a reading (which would no doubt otherwise be a false indication when the switch 78 is open) from the indicating couple 107—116. If it is desired to take a fine reading the operator closes the switch 78 at the metering or indicating station. The motor 220 is thereby energized, moves the finger 61 towards and into engagement with the periphery of the cam 55, and consequently causes the rotor 125 of the transmitter 120 to assume such a position that the fine meter will indicate at 107—116 the inches and fractions of an inch to be added to the reading in feet taken from the indicating couple 7—16, so as to give the accurate composite reading of the liquid level in feet, inches and fractions of an inch. It will be noted that neither of the rotors 25, 125, makes a complete revolution but each moves from a position to one side of mid position to the other side of mid position, and vice versa, for the complete range of its movement. The specific design of the periphery of the cam 55 need not be described in detail but will be within the skill of the artisan in view of its purpose, function, and intended operation as above set forth. The accuracy of its design will depend upon the desired accuracy of fine reading.

It will be borne in mind that the full scale reading (12 inches) of the scale 116 is, in the particular case described, equal to one of the coarse divisions (1 foot each) of the scale 16, which reads in feet. In reading the meters conjointly (the switch 78 being closed) the reading to be taken from the scale 16 is the lower of the feet readings on the scale 16 adjacent the pointer 7 and to this is added the reading taken from the fine reading couple 107—116. When the reading of the pointer 107 on the scale 116 is comparatively very low or very high, comparatively great care must be exercised in reading the couple 7—16. Thus suppose that the height of the liquid happens to be 6 feet and 0.5 inches when the reading is taken. The pointer 7 would then be slightly above but very close to the "6" calibration of the scale 16. If due to paralax or carelessness the observer should read the needle 7 as below the "6" calibration, he might take a reading of 5 feet and 0.5 inches, which would be an erroneous reading. Similarly, if the height of the liquid happens to be say 8 feet 11.5 inches, the pointer 7 would be slightly below but close to the "9" calibration on the scale 16 and the operator, if careless, may read 9 feet 11.5 inches, again an erroneous reading. While not indispensible but nevertheless desirable, I provide an arrangement for facilitating correct joint reading of the instruments. For this purpose the bars or cores 8, 108, are so placed parallel to each other, and the distance between them is such, and the relative polarity of the windings 12 and 112 is such with respect to each other and the windings 1a, 1b, 101a, 101b, that the magnetic field set up by the lower meter (Fig. 2) reacts upon that set up by the upper meter to produce the following operation. When the lower meter is so energized as to cause the pointer 107 to indicate at the low end of the scale 116, its magnetic reaction on the upper meter is such as to cause the pointer 7 to read slightly high, and when the lower meter is so energized as to cause the pointer 107 to indicate at the high end of the scale 116, its magnetic reaction on the upper meter is such as to cause the pointer 7 to read slightly low. This provides a factor of safety which does not unduly disturb the accuracy of the coarse (feet) reading when the coarse meter alone is read and which does not disturb at all the accuracy of joint reading of the meters but, on the contrary, insures accurate reading by the observer. The magnetic reaction between the meters, for the purpose last described, may be conveniently controlled and adjusted by means of an arcuate iron shield, i. e. an iron shield in the shape of a part of a cylinder, located as shown in dotted lines at 200 in Fig. 2. This shield 200 is of such size and shape, and so located as to adjust the reaction to the desired amount.

When the switch 78 is allowed to open, the finger 61 is moved away from the cam 55 by the weight 62, the pointer 107 moves off its scale, and the coarse (or upper) meter alone is read as before closure of the switch 78.

It will be understood that the transmitters 20, 120, and the motor 220, may be, and preferably are, enclosed in a single housing at the transmitting station and that the two meters may be, and preferably are, enclosed in a single casing at the more or less remotely located indicating or reading station. It will also be appreciated that the system and instrumentalities may be modified in various respects without departing from some of the broader aspects of my inventions.

Fig. 7 shows a modification which may be applied to the system of Figs. 2 to 6. According to this modification the switch 78 (see Fig. 2) at the indicating station is dispensed with; the line wires 76, 77 are dispensed with; the wire 72 connecting the points 71—73 is dispensed with; and the windings 223, 224, and 227 of the motor 220 are connected across the points 71—73, as shown in Fig. 7. In this modification the following additional changes should be noted.

The shaft 58 of the cam 55 has secured thereto a commutator 80 adapted electrically to connect the brushes or contacts 81, 82, and thereby short circuit the motor 220 (whose windings 223, 224, 227 are shown in Fig. 7) except when the insulating segment 83 of the commutator is under the brush 81. The commutator 80 is electrically conductive throughout substantially its entire periphery, its conductivity being interrupted only by the insulating segment 83 which is located at the X position of the cam 55 described above, particularly in connection with Fig. 4. In this modification shown in Fig. 7, a tension spring 84 suitably anchored at one end and secured at its other end to the arm 160 (corresponding to arm 60 of Fig. 3) tends to hold the finger 161 (corresponding to the finger 61 of Fig. 3) constantly in engagement with the periphery of the cam 55. When the commutator 80 is in its short-circuiting range, the motor 220 is inoperative and the finger 161 is held by the spring 84 in engagement with the periphery of the cam 55. At the time the cam 55 reaches its X position, the insulating segment 83 of the commutator comes under the brush 81 and breaks the short circuit across the motor 220. The windings 223, 224, 227, of the motor 220 are now energized and the motor moves the arm 160 (secured to the shaft 126 of the motor 220) and its finger 161 radially away from the periphery of the cam 55 in opposition to the action of the spring 84. The radial outward movement of the finger 161 is limited by its engagement with a guide 85 secured to the cam 55. When the high spot of the cam 55 has come under the finger 161, the motor 220 is again short-circuited by the commutator 80 and then ceases to exert its torque on the arm 160 of the finger 161 and the spring 84 again holds the finger 161 in engagement with the periphery of the cam 55. The guide 85 is so designed that the finger 161 is held thereby against or very close (with sufficient clearance to permit relative movement of the cam and the finger tangentially) to the periphery of the cam throughout the range of control of the guide 85. By virtue of this provision the point at which the commutator 80 again short circuits the motor 220 need not be as well defined as it otherwise would have to be.

The operation of the system modified as shown in Fig. 7 and above described need not be explained in detail but will now be apparent. When this modification is employed the coarse and fine meters (Fig. 2—right) indicate continuously and automatically. The fine meter indicates automatically throughout the entire peripheral travel of the cam 55. The meters are of course read as described above in connection with Figs. 2 to 6.

I shall now proceed to describe another form that my invention may assume. In this form the motor 220 (Fig. 2) and its elements, connections, and controlling switch (221, 222, 223, 224, 227, 76, 77, 78) are dispensed with, i. e. omitted, and the transmitter 120 is caused to function not only as a transmitter but also as a motor. In this case, a normally closed switch 90, which may be manually opened, is connected across one of the two windings 101a, 101b, (Fig. 2) as shown in Fig. 8. The cam 55 is constructed, mounted, and designed, as in the form of invention shown in Figs. 3 to 6. The arm 60, finger 61, and the stops 66, 67, of the arrangement shown in Figs. 3 and 6 are also employed in the modification now being described. However, the weight 62 is dispensed with, a spring (such as the spring 84 in Fig. 7) is provided to hold or tend to hold the finger 61 against the periphery of the cam 55, and the transmitter 120 is caused to move the finger 61 radially away from the periphery of the cam as I shall now explain in greater detail.

When the switch 90 (Fig. 8) is in its normally closed position the current relationship is such that the transmitter 120 acts as a motor with sufficient torque to overcome the spring (which spring, as described above, urges and tends to hold the arm in such position that the finger 61 engages the periphery of the cam 55) and to move the finger 61 radially away from the cam. In this case the needle or pointer 107 is off its scale 116 and the coarse meter reading alone is taken at 7—16. When it is desired to take a composite reading, i. e. the fine reading to supplement the coarse reading, the operator opens the switch 90. The connections between the transmitters 20 and 120 and their respective coarse and fine meters are as shown in Fig. 2; it being borne in mind that the motor 220 and its connections are in this case omitted. The transmitter 120 now has no sufficient torque as a motor to prevent the finger 61 from being moved into engagement with the periphery of the cam 55 by the spring. In other words, the cam 55 now determines the position of the rotor 125 (through the finger 61 whose arm 60 is secured to the shaft 126 of the transmitter 120) and the transmitter 120 causes the correct fine reading at the fine meter in the manner previously described. When the switch 90 is again closed, the transmitter 120 again acts as a motor to move the finger 61 to its outward off position, the fine reading needle 107 is again off its scale 116, and the coarse meter alone is read.

I shall now describe a further modification. This form of the invention is the same as that last described (Fig. 8) except that the switch 90 is normally open and is connected as shown in Fig. 9 instead of as in Fig. 8. Referring to Fig. 9, it will be seen that the switch 90 is connected in series in one of the line wires 147, 148, which extend from the fine reading meter to its transmitter 120. In this case, when the switch 90 is open, as it is normally, the transmitter 120 has sufficient torque acting as a motor to move the finger 61 away from the cam 55, the pointer 107 is off its scale 116, and the coarse meter alone indicates. When the switch 90 is closed, the transmitter 120 has no sufficient torque acting as a motor to hold the finger 61 off the cam 55 and the coarse and fine readings are transmitted and taken as above described.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim is:

1. An indicating system comprising in combination, a coarse transmitter, a fine transmitter, a device comprising a cam and follower for controlling the movement of said fine transmitter in accordance with uniformly varying subdivisions of equal portions of movement of said coarse transmitter, means for simultaneously actuating said coarse transmitter and said device at different predetermined rates, indicating means electrically controlled by said transmitters, and electromagnetically controlled means for rendering said device effective and ineffective to control said fine transmitter.

2. An indicating system comprising in combination, a coarse transmitter, a fine transmitter, means comprising a cam for controlling said fine transmitter, means for simultaneously actuating said coarse transmitter and said cam at different predetermined rates, indicating means electrically controlled by said transmitters, and electromagnetically controlled means for rendering said cam effective and ineffective to control said fine transmitter.

3. An indicating system comprising in combination, a coarse electrical transmitter, a fine electrical transmitter, a cam, a feeler member, electromagnetic means for controlling movement of said feeler member into operative engagement with and away from the cam, means controlling the fine transmitter by the position of the feeler member, means for conjointly operating the coarse transmitter and the cam at different predetermined rates, and indicating means electrically controlled by the transmitters.

4. An indicating system comprising in combination, a coarse electrical transmitter, a fine electrical transmitter, a cam, a member movable into and out of operative engagement with said cam and a motor for controlling movement of said member, means controlling the fine transmitter by the position of said member, means for operating the coarse transmitter and cam at different predetermined rates, and indicating means electrically controlled by the transmitters.

5. An indicating system comprising in combination, a coarse electrical transmitter, a fine electrical transmitter, a cam, a member movable into and out of operative engagement with said cam and an electric motor for controlling movement of said member, means controlling the fine transmitter by the position of said member, means for operating the coarse transmitter and cam at different predetermined rates, indicating means electrically controlled by the transmitters, and circuit means comprising a manually operable switch for controlling said motor.

6. An indicating system comprising in combination, a coarse electrical transmitter, a fine electrical transmitter, a cam, a member movable into and out of operative engagement with said cam and an electric motor for controlling movement of said member, means controlling the fine transmitter by the position of said member when in contact with the cam, means for operating the coarse transmitter and cam at different predetermined rates, indicating means electrically controlled by the transmitters, and circuit means comprising switch means automatically controlled in accordance with the position of the cam for controlling the motor.

7. An indicating system comprising in combination, a coarse transmitter, a fine transmitter, a cam, a member secured to the shaft of the fine transmitter and movable into and out of operative engagement with the cam, and means for operating the coarse transmitter and the cam simultaneously at different predetermined rates.

8. An indicating system comprising in combination, a coarse transmitter, a fine transmitter, a cam, a member secured to the shaft of the fine transmitter and movable into and out of operative engagement with the cam, means for simultaneously operating the coarse transmitter and cam, indicating means controlled by the transmitters, and means controllable at the indicating station for causing the fine transmitter to operate said member.

9. An indicating system comprising in combination, a movable coarse indicating element and means for actuating said element, a movable fine indicating element, and means for actuating said second mentioned element and operable upon said first mentioned means for causing said coarse indicating element to read slightly high when said second mentioned element reads low and for causing said coarse indicating element to read slightly low when said second mentioned element reads high.

10. An indicating system comprising in combination, a coarse electrical transmitter, a fine electrical transmitter, a cam, a member movable into and out of operative engagement with said cam and a motor for controlling movement of said member, means controlling the fine transmitter by the position of said member, means for operating the coarse transmitter and cam at different predetermined rates, indicating means electrically controlled by the transmitters, and means for setting said motor in operation at will.

HARRY L. TANNER.